United States Patent
Pelton

(10) Patent No.: US 10,422,122 B2
(45) Date of Patent: Sep. 24, 2019

(54) BAMBOO POLE CONNECTORS

(71) Applicant: Raymond Collin Pelton, Kurtistown, HI (US)

(72) Inventor: Raymond Collin Pelton, Kurtistown, HI (US)

( * ) Notice: Subject to any disclaimer, the term of this patent is extended or adjusted under 35 U.S.C. 154(b) by 382 days.

(21) Appl. No.: 15/215,796

(22) Filed: Jul. 21, 2016

(65) Prior Publication Data

US 2016/0326736 A1    Nov. 10, 2016

Related U.S. Application Data

(63) Continuation of application No. 14/199,992, filed on Mar. 6, 2014, now Pat. No. 9,429,184, which is a continuation-in-part of application No. 13/315,132, filed on Mar. 28, 2012, now abandoned, and a continuation-in-part of application No. 13/315,260, filed on Jan. 17, 2012, now abandoned.

(60) Provisional application No. 61/433,119, filed on Jan. 14, 2011, provisional application No. 61/435,769, filed on Jan. 24, 2011.

(51) Int. Cl.
*E04B 1/26* (2006.01)
*F16C 11/04* (2006.01)
*E04B 1/58* (2006.01)
*E04B 1/19* (2006.01)
*E04C 3/36* (2006.01)

(52) U.S. Cl.
CPC .......... *E04B 1/2604* (2013.01); *E04B 1/1903* (2013.01); *E04B 1/585* (2013.01); *E04C 3/36* (2013.01); *F16C 11/04* (2013.01); *E04B 2001/266* (2013.01); *E04B 2001/2616* (2013.01); *E04B 2001/2652* (2013.01); *E04B 2001/2668* (2013.01); *E04B 2001/2676* (2013.01); *Y10T 29/49826* (2015.01); *Y10T 403/32114* (2015.01)

(58) Field of Classification Search
CPC ... E04F 11/18; E04F 11/1808; E04F 11/1819; E04F 11/1821; E04F 11/1834; E04B 2001/2616; E04H 17/1421; E04H 17/1431; E04H 17/1447; E04H 17/1491; E04H 17/14; E04H 17/1413; E04G 7/02; E04G 7/18; E04G 7/24; E04G 7/26; E04G 7/12; E04G 7/14; E04G 7/16
See application file for complete search history.

(56) References Cited

U.S. PATENT DOCUMENTS 1,839,711 A * 1/1932 Sommer ............. E04F 11/1834
                                                   403/68
3,092,407 A * 6/1963 Blonder ................... E04G 7/02
                                                   256/65.05

(Continued)

*Primary Examiner* — Daniel J Wiley
(74) *Attorney, Agent, or Firm* — Hawaii Patent Services; Nathaniel K. Fedde

(57) ABSTRACT

This invention provides connector assemblies comprising at least two connector elements pivotally joined to each other, wherein each connector element is configured for attachment to a natural tree pole such as bamboo. Useful connector elements include members configured to conform the surface of a natural tree pole. Useful connector elements include terminal connector elements configured for attachment to the terminal end of a natural tree pole and side connector elements configured for attachment to the side of a natural tree pole.

11 Claims, 16 Drawing Sheets

(56) References Cited

U.S. PATENT DOCUMENTS

| | | | | |
|---|---|---|---|---|
| 3,157,388 A * | 11/1964 | Nelson | | E04H 17/1413 256/68 |
| 3,495,857 A * | 2/1970 | Hawke | | E04B 1/5831 403/57 |
| 3,524,627 A * | 8/1970 | Boyanton | | E04H 17/1413 248/230.5 |
| 3,674,243 A * | 7/1972 | Brown | | E04H 17/06 256/35 |
| 3,733,055 A * | 5/1973 | Hughes, Jr. | | E04F 11/184 256/21 |
| 3,820,909 A * | 6/1974 | Schindler et al. | | E04H 17/1413 256/65.04 |
| 4,193,585 A * | 3/1980 | Eandi | | E04F 11/184 182/106 |
| 4,208,038 A * | 6/1980 | Reid | | E04H 17/00 256/21 |
| 4,381,635 A * | 5/1983 | Solo | | E04B 1/2608 52/639 |
| 4,526,348 A * | 7/1985 | Cammack | | E04H 17/1413 256/65.06 |
| 4,566,819 A * | 1/1986 | Johnston | | E04G 7/14 403/385 |
| 4,624,374 A * | 11/1986 | Murtaugh | | B63B 17/04 211/182 |
| 5,141,207 A * | 8/1992 | Meglino | | E04F 11/18 256/1 |
| 5,427,465 A * | 6/1995 | Sato | | E04G 7/16 403/385 |
| 5,443,232 A * | 8/1995 | Kesinger | | F16L 3/24 248/62 |
| 5,593,143 A * | 1/1997 | Ferrarin | | E04H 17/08 248/68.1 |
| 6,736,373 B2 * | 5/2004 | Greaves | | E04F 11/1834 256/65.16 |
| 7,412,804 B1 * | 8/2008 | Bussinger | | E04B 1/2604 403/190 |
| 2003/0234391 A1 * | 12/2003 | Sheppard | | E04F 11/1834 256/67 |
| 2008/0029748 A1 * | 2/2008 | Ford | | E04H 17/1413 256/65.03 |
| 2009/0032792 A1 * | 2/2009 | Ford | | E04F 11/1834 256/67 |
| 2014/0199112 A1 * | 7/2014 | Milner | | E04F 11/1834 403/72 |

* cited by examiner

BAMBOO POLE CONNECTORS

CROSS-REFERENCE TO RELATED APPLICATIONS

This application is a continuation of U.S. application Ser. No. 14/199,992 having a filing date of 6 Mar. 2015, which is a continuation-in-part of U.S. application Ser. No. 13/315,132, having a filing date of 28 Mar. 2012, which claims priority to U.S. Provisional Application No. 61/433,119 having a filing date of 14 Jan. 2011, and is a continuation-in-part of U.S. application Ser. No. 13/315,260, having a filing date of 17 Jan. 2012, which claims priority to U.S. Provisional Application No. 61/435,769, having a filing date of 24 Jan. 2011.

TECHNICAL FIELD

The present invention relates to connectors for bamboo or other natural tree poles.

BACKGROUND

Bamboo has been and continues to be used for building as a structural material. It is known to satisfy a variety of construction needs, surviving time, earthquakes, windstorms and other natural disasters.

Throughout history, man has been concerned in developing construction methods and technologies which will solve the high demand for shelter with efficiency and with low environmental impact. It is therefore advantageous to find a practical joinery system for the use of natural bamboo poles, and also use with natural tree poles. The bamboo plant itself provides many benefits to the growing environment, and can provide many uses besides construction material, such as food value for human and livestock. The benefits of bamboo plant production include protection of water resources, erosion control, and having generation of natural woodland faster than any other forestry resource, and has perpetual self-regeneration. Harvesting never kills the plant which preserves the ecosystem over time.

There is also the potential of high economic impact for regional development for the generation of raw material capital wealth and employment without the use of high cost and damaging effects of heavy equipment and massive industrial processing.

In other counties the joining of bamboo in construction has enabled a wide range of possibilities due to low cost labor using traditions of tools and techniques that require knowledge and skill not found in North America. The search for prior art in the US and internationally that relates to most construction inadequately addresses the unique characteristics of bamboo in a practical and industry competitive way.

Traditional means of joining are not acceptable in the Uniform Building Code at this time in the US.

Contemporary systems are not practical for wide range application and acceptance as a means of utilizing bamboo as an alternative to conventional ways of construction by building professionals, and trade workers. This is due to high labor costs of highly skilled workers. US 2010/0083605 (Wallner) describes a system having connectors but can only utilize a 3 foot maximum length of bamboo pole before requiring a bulky laminated wood joint having epoxy adhesive and uses more material than 20 feet of bamboo, thus making the bamboo material use much less significant. Wallner does not teach a connector assembly comprising pivotally connected connector elements or connector elements comprising conformable members configured to conform to the irregularities of bamboo. No prior art addresses the irregularities of the long useable lengths of natural bamboo poles with an adjustable means of compensating for the irregularities with an off the shelf system.

SUMMARY OF THE INVENTION

A first aspect of the invention provides connector assemblies of adjoining adjustable elements ('connector elements'). The connector assembly comprises a first connector element and a second connector element. Each of the connector elements is configured for attachment to a respective natural tree pole (e.g. bamboo) and adjustably (e.g. pivotally) joined to another connector element such that the attached natural tree poles can be adjustably (e.g. pivotally) connected to each other.

Optionally, the connector assembly comprises one or more terminal connector elements, one or more side connector elements, or a combination thereof. Optionally, the connector assembly comprises a terminal connector element pivotally joined to a side connector element. Optionally, the connector assembly comprises a first side connector element pivotally joined to a second side connector element. Optionally, the connector assembly comprises a first terminal connector element, a second terminal connector element, and a side connector element, wherein each of the first terminal connector element and the second terminal connector element are pivotally joined to the side connector element ('double pole side mounting').

Optionally, the connector assembly comprises a pivot for adjustably joining the first and second connector elements, e.g. a crossing pivot or a non-crossing pivot.

Optionally, one or more of the connector elements comprise a member configured to conform to the surface of a natural tree pole ('conformable member') and a one or more fastening devices configured for securing the conformable member to the surfaced of the natural tree pole. Optionally, the one or more fastening devices are selected from a screws, a cross bolt, and a band. Optionally, the one or more fastening devices comprise a band and at least one additional fastening device (e.g. a cross bolt, a screw, or both). Optionally, the conformable member comprises flexible steel.

Optionally, the connector elements are adjustably joined to each other by a pivot. For example, each of the connector elements optionally comprises a pivot plate (e.g. a flat plate), and the connector assembly comprises a pivot bolt pivotally joining the pivot plates together. As another example, each of the connector elements optionally comprises a disk (e.g. mounted centrally on each connector element), and the connector assembly optionally comprises a pivot cap screw pivotally joining the pivot plates together.

Optionally, at least one of the connector elements is configured for attachment to a terminal end of a natural tree pole ('terminal connector element'). Optionally, the terminal connector element comprises a receiver tube configured to accept the terminal end of a natural tree pole. Optionally, the connector assembly comprises a pivot configured to pivotally connect the end of first a natural tree pole with the side of a second natural tree pole, for example, a pivot which does not permit crossing of the first and second natural tree poles ('non-crossing pivot').

Optionally, at least one of the connector elements is configured for attachment to a side of a natural tree pole ('side connector element'). Optionally, the side connector element comprises a curved member configured for attachment to the side of a natural tree pole ('tube segment').

Optionally, the connector assembly comprises a non-crossing pivot (e.g. in a connector assembly comprising a terminal connector element and a side connector element) or a crossing pivot, i.e. a pivot configured to pivotally connect the side of first a natural tree pole with the side of a second natural tree pole and allows the first and second natural tree poles to cross.

Optionally, the connector assembly comprises a terminal connector element and a side connector element adjustably joined to each other. Optionally, the connector assembly comprises a non-crossing pivot.

Optionally, the connector assembly comprises two side connector elements adjustably joined to each other. Optionally, the connector assembly comprises a crossing pivot.

Optionally, the connector assembly comprises two terminal connector elements adjustably joined to each other.

In one embodiment, the first connector element is a terminal connector element and the second connector element is a side connector element, wherein the terminal connector element and the side connector element are pivotally joined to each other (sometimes referred to herein as connector assembly BL12). Optionally, the terminal connector element comprises a receiver tube and the side connector element comprises a tube segment.

In one embodiment, the first connector element is a first side connector element and the second connector element is a second side connector element, wherein the first and second side connector elements are pivotally joined to each other (sometimes referred to herein as connector assembly BL9). Optionally, each of the first and second side connector elements comprises a tube segment.

A second aspect of the invention provides a structure comprising a plurality of natural tree poles (e.g. bamboo) and at least one connector assembly, wherein each connector element of the plurality of the at least one connector assembly is attached to one of the plurality of natural tree poles. Optionally, the structure comprises a building, scaffolding, a rack, or furniture. Optionally, the plurality of connector assemblies comprises at least one connector assembly BL12, at least one connector assembly BL9, or both. Optionally, the natural tree poles are bamboo.

A third aspect of the invention provides a method of adjustably joining a first natural tree pole and a second natural tree pole, the method comprising providing a connector assembly of the invention, attaching a first connector element of the connector assembly to the first natural tree pole, and attaching a second connector element of the connector assembly to the second natural tree pole. Optionally, the natural tree poles are bamboo.

BRIEF DESCRIPTION OF THE DRAWINGS

FIG. 8 also illustrates the capacity for double pole side mounting.

REFERENCE NUMERALS IN DRAWINGS

Figure 1:
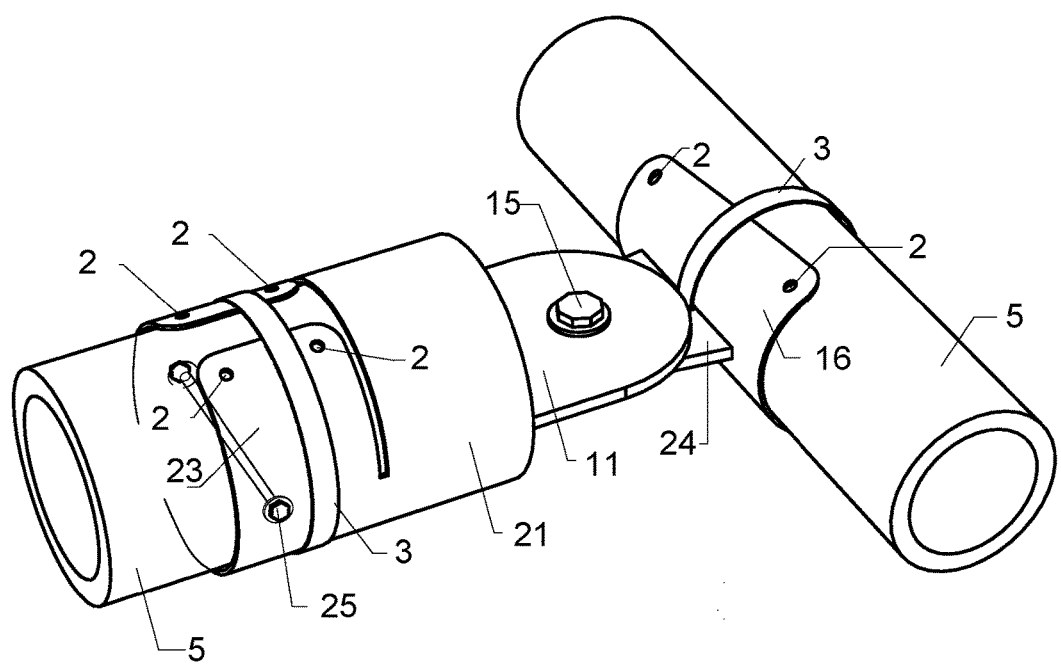
FIG. 1 shows an upper perspective view of a connector assembly of the invention comprising a terminal connector element pivotally joined to a side connector element. Each of the connector elements are mounted to bamboo.

1 Tube segment
2 Set screw holes
3 Stainless steel bands
4 Threaded hole in disc
5 Bamboo pole
6 Set screw
7 Stainless steel band clamp
8 Tube segment
9 Disc connection with countersink pivot hole for cap screw
10 Cap screw
11 Pivot plate 12 Set screw hole
13 Cross bolt hole
15 Pivot bolt, washer, lock washer, and nut assembly
16 Tube segment
18 Slot for stainless steel band
19 Pivot bolt hole
21 Receiver tube
22 Pivot plate base
23 Collar tab
24 Pivot plate
25 Cross bolt
26 Pivot range

DETAILED DESCRIPTION OF THE INVENTION

Connector Elements

In one embodiment, the present invention provides connector assemblies comprising two or more connector elements pivotally joined toe each other, wherein each connector element is configured for attachment to a respective natural tree pole (e.g. bamboo).

Terminal Connector Elements

Figure 5:
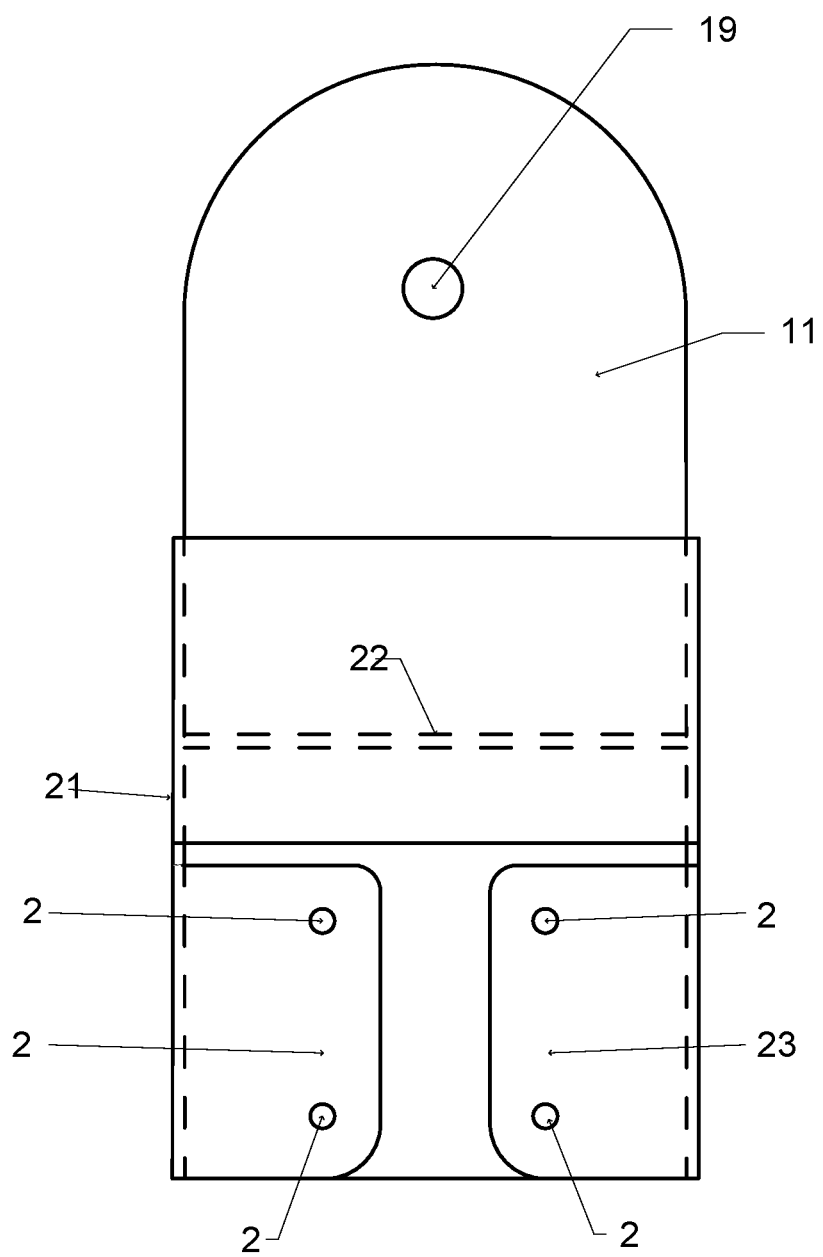
FIG. 5 shows a side view of the terminal connector element shown in FIG. 1 and FIG. 2.
Figure 6:
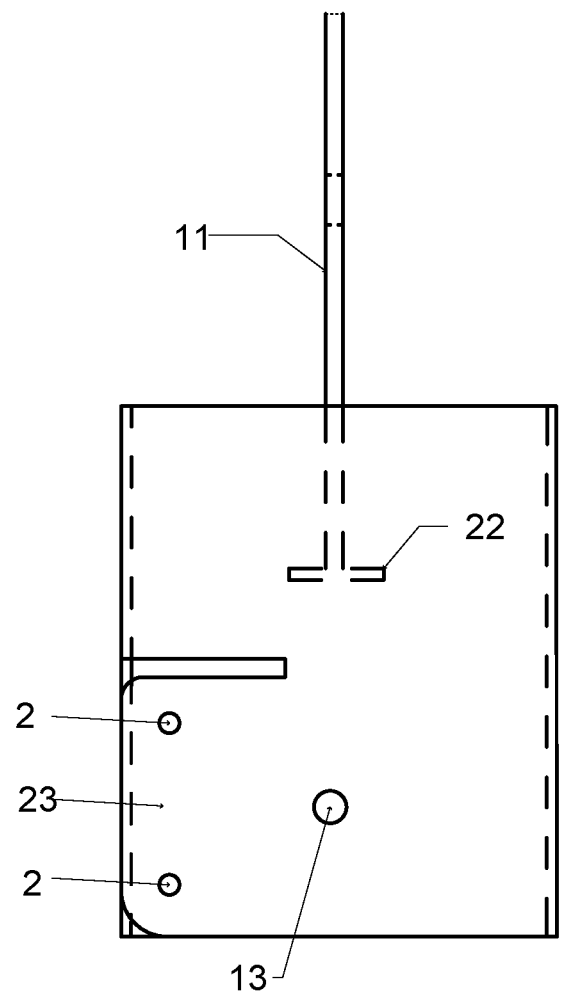
FIG. 6 shows an end view of the terminal connector element shown in FIG. 5.
Figure 7:
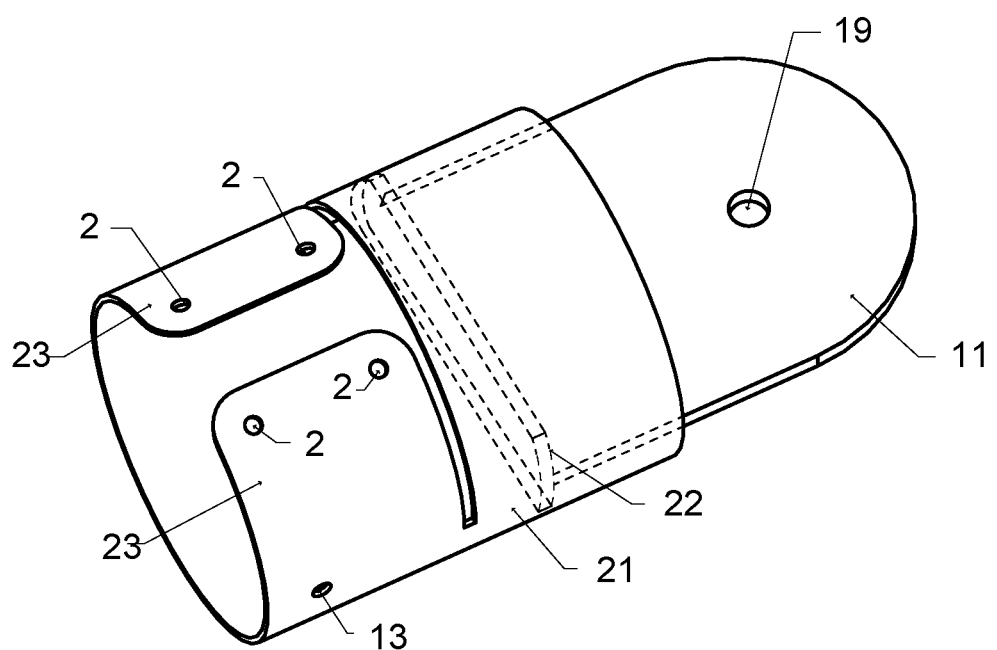
FIG. 7 shows a perspective view of the terminal connector element shown in FIG. 5.

Optionally, at least one of the connector elements is a terminal connector element. The terminal connector element can be any connector element comprising a receiver tube configured to receive the terminal end (i.e. butt end) of a tree pole. The receiver tube can be configured to receive the terminal end of the tree pole by providing the receiver tube with a base and an open end (e.g. base 22 and open end having collar tabs 23, as depicted in FIG. 5). For example, a receiver tube can be mounted to a tree pole by inserting the terminal end of the tree pole into the open end of the receiver tube until the tree pole contacts the tree pole and inhibits further insertion. The terminal connector element can also comprise a collar with tabs configured to conform to the tree pole and a fastener (e.g. screws, a bolt, and/or a band) configured to attach the collar tabs to the tree pole. Optionally, the terminal connector element is pivotally mounted to another connector element by a pivot plate.

Side Connector Elements

Optionally, at least one of the connector elements is a side connector element. The side connector element can be any connector element comprising a curved member configured for attachment to the side of a natural tree pole ('tube segment'). The tube segment is optionally conformable, e.g. configured to flex and conform the surface of a tree pole. The tube segment is optionally configured to provide a pole mounting surface and spread the load across the surface area of the pole circumference. The tube segment is optionally configured for attachment to the side of a tree pole via set screws, one or more bands, or both. Optionally, the side connector element is pivotally mounted to another connector element by a pivot plate or a disk.

Conformable Members

Optionally, a connector element useful in the present invention comprises one or more conformable members configured to conform to a natural tree pole. For example, the conformable member can optionally flex laterally (relative to the pole) to accommodate poles of varying diameter. Further, the conformable member can optionally flex longitudinally as well, e.g. to conform to irregularities of natural tree poles such as bamboo. For example, a single bamboo pole typically does not have a constant diameter along its longitudinal length. Accordingly, a conformable member (e.g. a conformable tube segment) may need to flex both laterally to around the pole and longitudinally to accommodate the varying diameter of the pole.

Fastening Devices

Connector elements can be fastened to tree poles with any fastening device. Optionally, the connector assembly comprises a plurality of fastening devices. Optionally, a connector element comprises one or more fastening devices selected from set screws (or screw holes), a bolt (or bolt holes), and a band (e.g. permanent band or circular clamp).

Pivot Joints

A connector assembly can comprise two or more connector elements pivotally joined to each other. Any pivot joint is useful in the present invention. Optionally, the pivot joint is a joint terminally connects a tree pole with another pole (e.g. 'terminal joint'). Such a pivot joint is useful, e.g. in connector assemblies comprising at least one terminal connector element. Optionally, the pivot joint is a joint that joins the side of one tree pole to the side of another tree pole such that the two tree poles can cross each other. ('bypass joint'). Such a pivot joint is useful, e.g. in connector assemblies comprising two side connector elements.

OBJECTS AND ADVANTAGES OF THIS INVENTION

An optional embodiment of the invention provides a connector assembly comprising a terminal connector element pivotally jointed to a side connector element. In this embodiment, an object of the invention is to provide an assembly of two joining connector elements selected from an inventory of sizes of each of said connector elements. The terminal end element fits the terminal end diameter of a natural bamboo or tree pole. The side element fits to the side diameter of an adjoining pole joint application. In one mode of carrying out the invention, the connection is made between the connector elements by means of a single bolt at a wide range of angles. The invention would function to exceed and enhance the loading strength of that portion of the frame. Therefore the connection would accomplish the design function of this particular location exactly as intended by the frame designer and engineer by means of transferring the loads from one pole member to another in a simple and user friendly manner. The advantages of one mord of carrying out the invention over any traditional or recently developed system are the following: Each of the elements is attached temporarily at the prescribed location of the frame by means of high strength adjustable circular clamps and the pivoting joint bolts until all the collective joints of the frame are in place. This allows for the adjustment of all locations due to the irregularities of the natural bamboo poles that affect the frame design configuration. Once the builder is satisfied with all the adjusted joint locations the temporary fastening can then be replaced with the appropriate prescribed permanent fastening hardware. Without this unique advantage of adjustability the bamboo would necessarily be forced into position, thus stressing the frame members in undesirable ways with unpredictable outcomes. This adjustable feature allows for the use of longer continuous pole members by designers without concern for the irregularities that are normal in poles that have functional value in lengths up to 60 feet, depending on the timber species. In addition, experienced bamboo builders adapt to the irregularities by taking the advantage of selective pole arrangement utilizing the irregularities by twisting the poles into position after said poles have been joined due to the invention adjustability.

An optional embodiment of the invention provides a connector assembly comprising a first side connector element pivotally jointed to a second side connector element. In this embodiment, an object of the invention is to provide an assembly of two joined connector elements selected from an inventory of sizes of each of said connector elements to function as a means of joining together natural bamboo poles in structural frame bypass joints at all angles. The invention compensates for the irregularities and side loading problems of any natural bamboo pole. The invention also enhances the overall characteristics inherent in natural bamboo by eliminating point loads in side to side intersections to the extent that bamboo structures built with the invention become a superior lightweight choice for a significant portion of building applications. For an appreciation of the invention's design the viewer must realize that to counteract the load forces of extreme wind load variations, all structural frames needs flexibility. Bamboo is superior in this regard. The invention allows flexural movement without any negative results as proven in actual extreme natural event circumstances (100 hrs. of wind speeds varying from 40 mph to 80+ mph). The advantages of the invention over any traditional or recently developed system are the following: In one method of using the invention, each of the connector elements is attached temporarily at the prescribed location of the frame by means of high strength adjustable circular clamps and the pivoting joint until the remaining collective joints of the frame are in place. This allows for adjustment of all locations at any time during construction due to the irregularities of the natural bamboo poles that affect the frame design configuration. Once the builder is satisfied with all the adjusted joint locations the temporary fastening can then be replaced with the appropriate prescribed permanent fastening hardware. Without this unique advantage of adjustability the bamboo would necessarily be forced into position, thus stressing the frame members in undesirable ways with unpredictable outcomes. This adjustable feature allows for the use of longer continuous pole members by designers without concern for the irregularities that are normal in poles that have functional value in lengths up to 60 feet, depending on the timber species. In addition, experienced bamboo builders adapt to the irregularities by taking the advantage of selective pole arrangement utilizing the irregularities by twisting the poles into position after said poles have been joined, due to the invention adjustability. This feature also allows the designer to include natural curvature as a predictable design feature. To illustrate the light weight advantages an entire 800 square foot portable bamboo open pavilion frame poles, with all the connector elements of the invention installed; the prebuilt frame was loaded on a ¾ ton pickup truck with a top rack (without overloading), and transported 100 miles to a construction site for installation.

While the description of my invention contains many specificities these should not be construed as limitations of the scope of the invention, but rather as an exemplification of one preferred embodiment thereof. Many other variations have been used. The following are example embodiments to carry out the invention.

EXAMPLES

Figure 2:
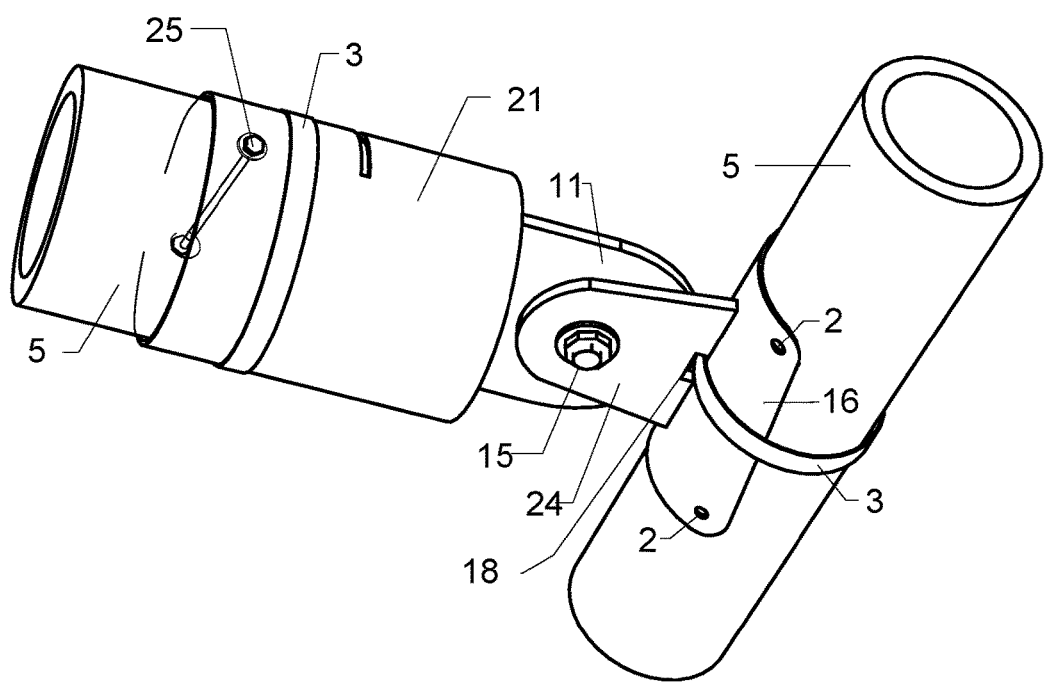
FIG. 2 shows a lower perspective view of the connector assembly shown in FIG. 1.
Figure 8:
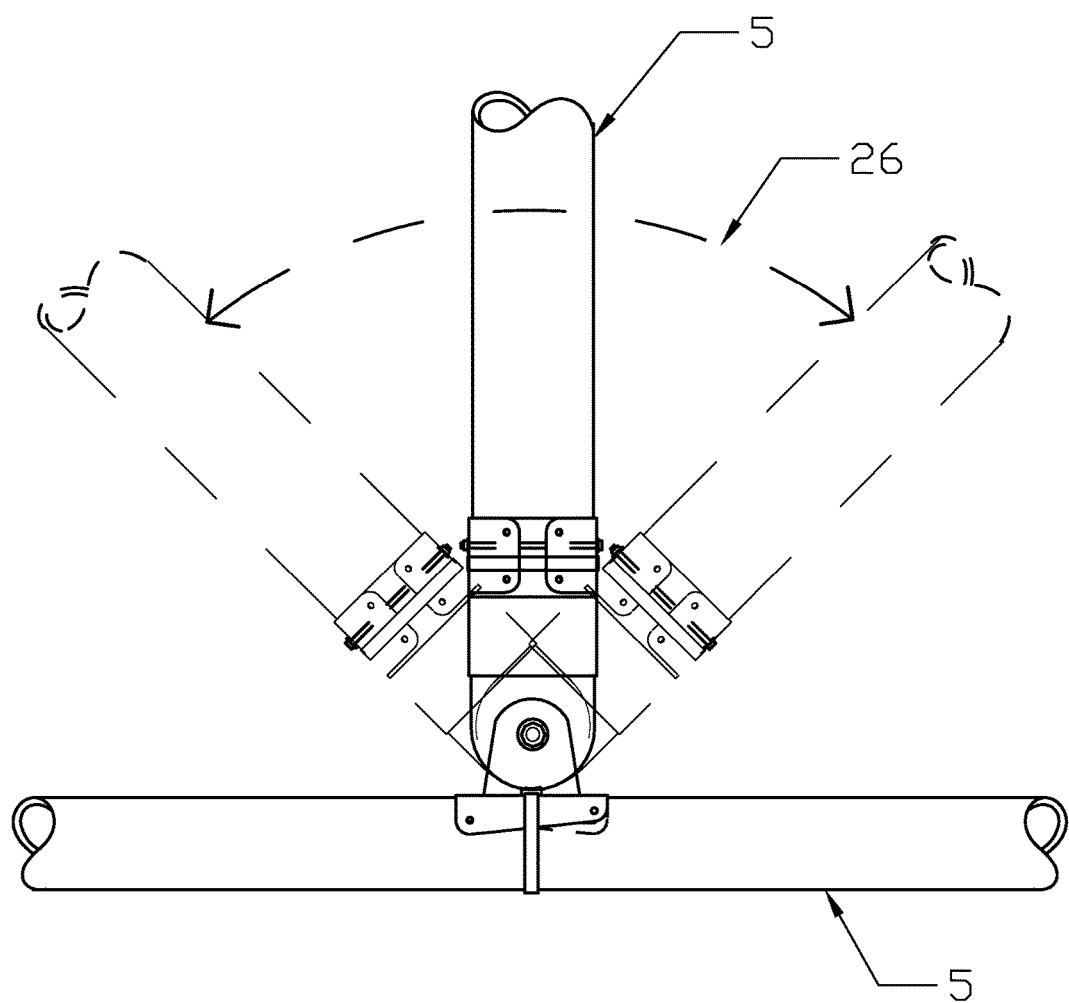
FIG. 8 shows angle variations of the connector assembly shown in FIG. 1, mounted on bamboo poles.

Example 1 Connector Assembly Comprising a Terminal Connector Element Pivotally Joined to a Side Connector Element One embodiment of the invention provides a connector assembly comprising a terminal connector element pivotally joined to a side connector element, as depicted in FIG. 1 and FIG. 2. This embodiment is configured to provide a connection between the side of one bamboo pole and the terminal end of another bamboo pole. The side connector element comprises a tube segment 16 configured for attachment to the side of one bamboo pole 5. The terminal connector element comprises receiver tube 21 and a collar with tabs 23 configured for receiving and attaching to the terminal end of bamboo pole 5. The two connector elements make up the connector assembly and join together by the pivot bolt centered on the corresponding pivot plates (11,24) having a pivot range 26 with a minimum 90 degree range of angles, 45 degrees on each side of perpendicular and parallel to the poles, as depicted in FIG. 8. As can be seen in FIG. 8, a connector assembly can optionally comprises two terminal connector elements pivotally connected to a side connector element.

The tube segment 16 of the side connector element fits onto the round side of the pole 5. The tube segment 16 is designed to flex to accommodate a pole diameter variation of 0.45 inch due to the thinness of the tube segment 16. The tube segment 16 also functions as a means of spreading the load across the surface area of the bamboo pole circumference. The tube segment 16 also functions as a mounting surface for the fastening system (FIG. 2). The pivot plate 24 of the side connector element is welded to the tube segment 16 and has a slot 18 for passing a central fastening band 3. The pivot 24 plate functions as a means of joining with the pivot plate 11 of the terminal connector element. The pivot plates 11, 24 joined to each other with a pivot bolt assembly 15.

Figure 3A:
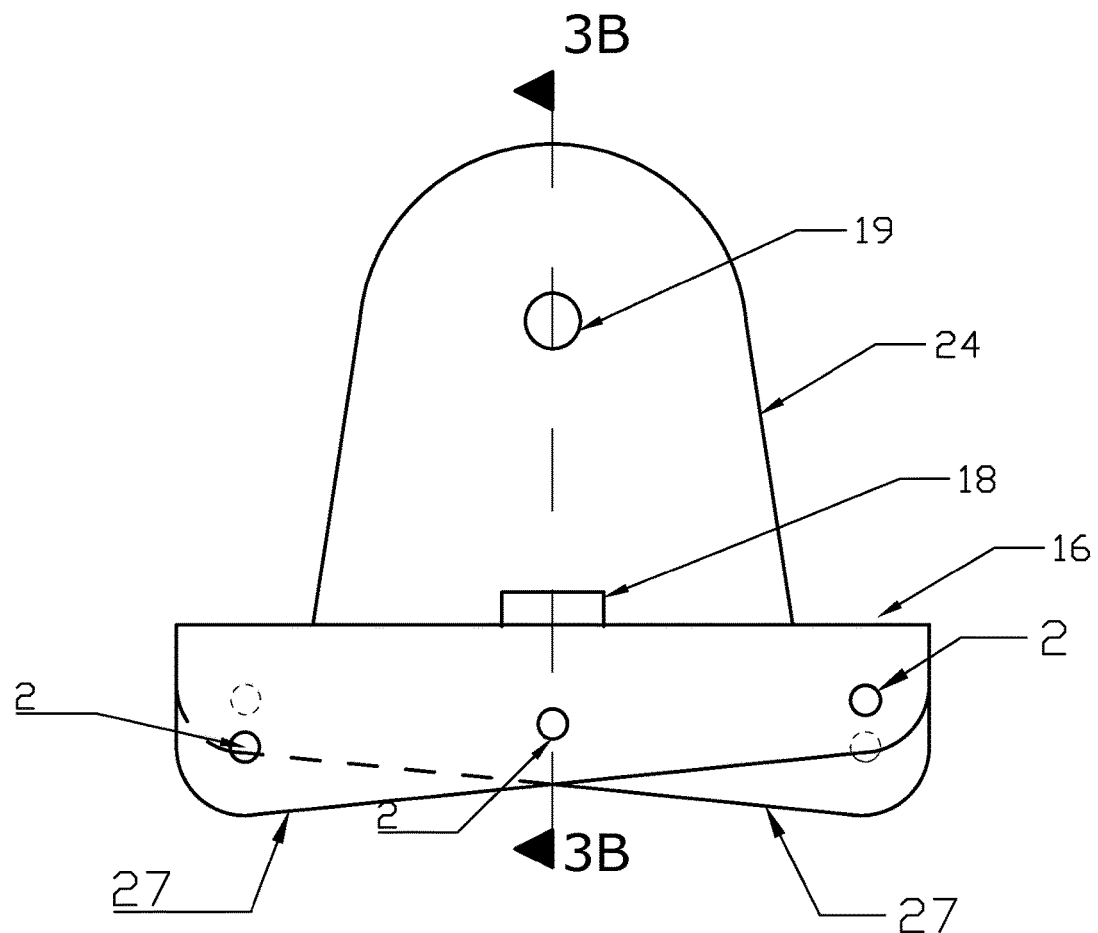
FIG. 3A shows a side view of the side connector element of the connector assembly shown in FIG. 1 and FIG. 2, unmounted, allowing the viewer to understand the tube segment configuration that offsets the set-screw holes to prevent grain splits in the longitude of the bamboo poles.
Figure 3B:
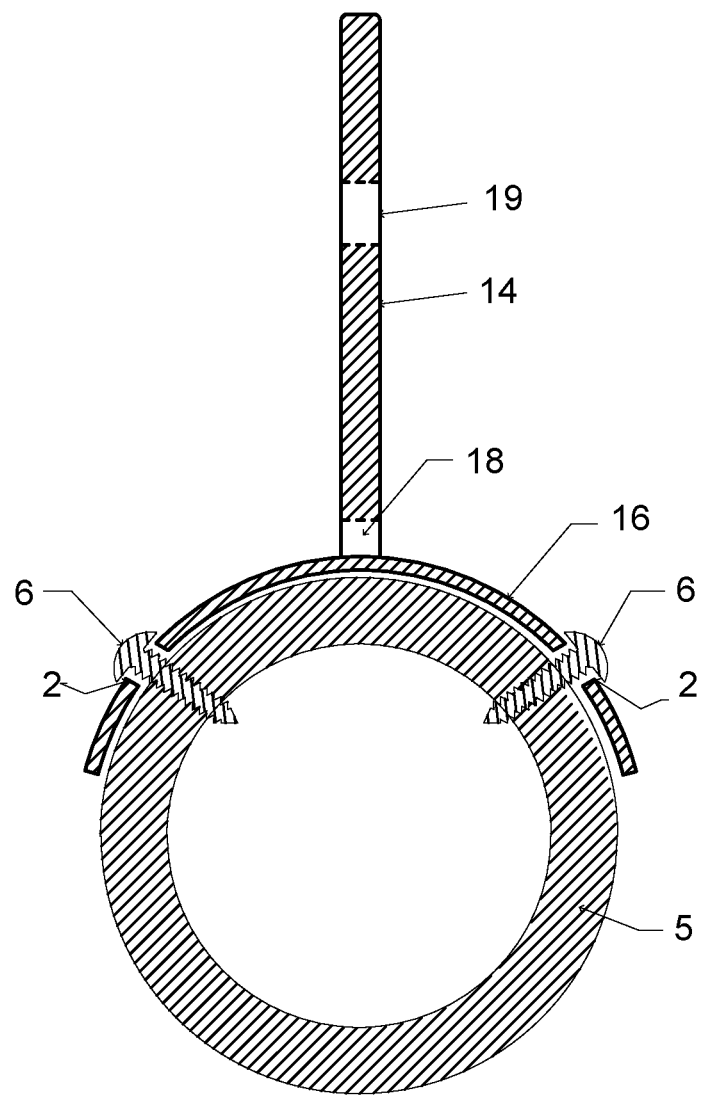
FIG. 3B shows an end view of the side connector element shown in FIG. 3A, side mounted to a bamboo pole, including set screws in place in prevent rotation of said element on the pole, which can also be used as a sole means of attachment in light load conditions.
Figure 4:
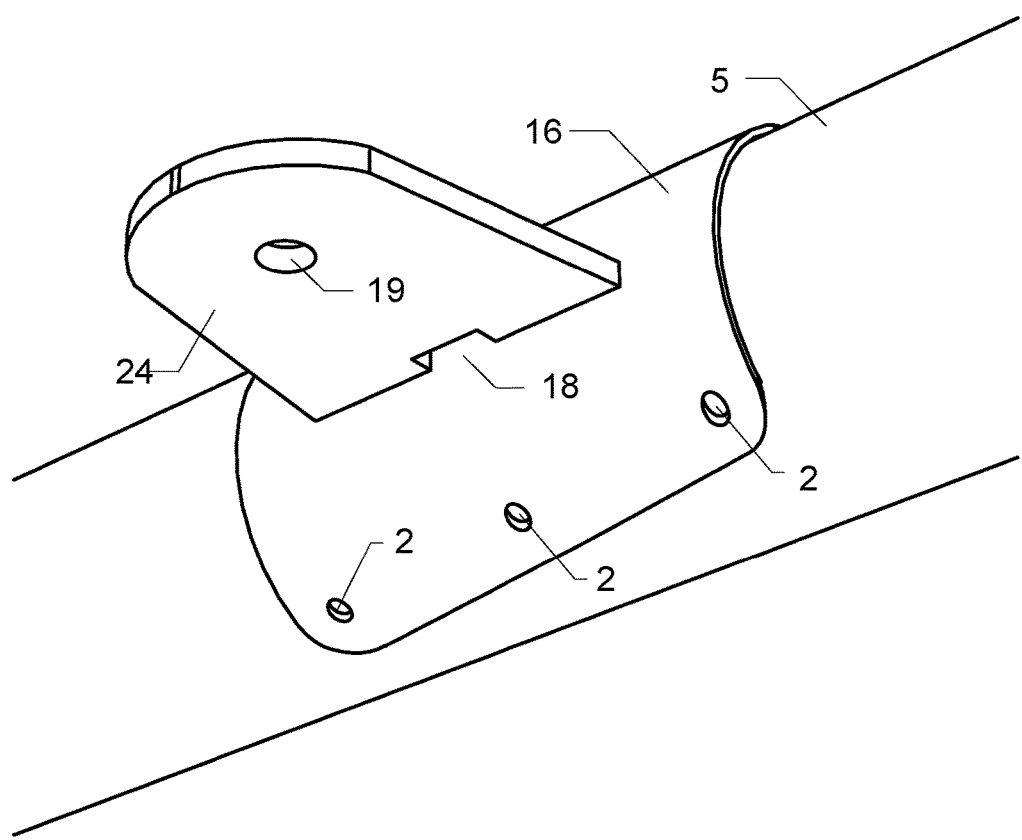
FIG. 4 shows the orientation of a side connector element when mounted on bamboo pole in isometric view. No fasteners are shown.

The fastening system on the tube segment 16 of the side connector element includes 1000 psi steel banding 3. One or two bands are normally used depending on load requirements. Up to six set screws 6 can function as the sole means of fastening the tube segment 16 to the pole but primarily function as a means to prevent rotation and sliding; or in redundant conjunction with the banding, which when combined can withstand the more critical loads eliminating the possibility of rotation, sliding, and pull out of the element from the pole. As depicted in FIG. 3A, the unparalleled edges 27 of said tube segment 16 are designed to offset the set screw holes 2 to prevent pole splitting due to the longitudinal grain of bamboo.

The terminal connector element comprises a receiver tube 21 configured for receiving and fitting snuggly over the terminal end of the adjoining bamboo pole 5 so that the tube collar tabs 23 can conform to the pole irregularity. Only one inch of the exterior pole end is milled to the internal diameter of the tube receiver 21 where the pole is gently inserted with a rubber mallet until said pole contacts the pivot plate base 22 welded to the opposite end of the receiver tube. The opposite end of the receiver tube, past the pivot plate base 22, as depicted in FIG. 5, is also welded to sides the pivot plate 11.

The fastening system of the terminal connector element includes a 1000 psi steel band 3 or equivalent, secured around the collar tabs 23 which are connected to the receiver tube 21. The collar tabs 23 can be attached to the bamboo pole with either a cross bolt 25 inserted perpendicularly through bolt holes 13 and extending through the bamboo pole 5, primarily used for pullout and rotation of the pole, and/or up to four set screws 2 either to be used with the cross bolt 25, band 3, or independently in light applications. Said fastening variations depend on the estimated load for the connector on the pole, and for pullout under tension. As previously stated, the invention can be temporarily secured pending adjustment with adjustable circular clamps.

Example 2 Method of Using a Connector Assembly

The connector assembly detailed in Example 1 is used to create a structure with bamboo poles.

Poles of the bamboo structure are selected by diameter and length for the location in the frame construction design. Once a first pole is sized the exact terminal end diameter is measured to determine selection of receiver tube 21 size of the terminal connector element for fitting to the pole. Size increments are ⅝ inch for the elements. The pole end is milled for precise fit to the receiver tube 21 and inserted by means of gentle pounding with rubber or wood mallet tool until contact of pole end against pivot plate base 22 inside and at the end of the receiver tube 21. A stainless steel circular clamp is tightened around the collar tabs 23 to secure the terminal connector element temporarily. To join the other end of the bamboo pole to a terminal connector element of a second connector assembly, the exact same procedure is then repeated for the other end of the selected pole aligning the pivot plates of both ends as required by location of pole in the frame.

Next; the location(s) on the adjoining pole side(s) for the side connector elements are determined and measured for approximate diameter to the nearest ½ inch. This measurement will determine the size selection of the side connector element(s) since the elements are fabricated in increments of ⅝ inch. The tube segment 16 of the connector element is then gently pounded as needed on a round bamboo surface to cause the tube to expand or contract to fit the location. All connector element tube segments are made with mild steel prescribed thickness to allow for flexing slightly without fatigue or other damage.

Next, the selected side connector element is secured to its location by means of temporary clamp(s).

Next; the terminal connector elements that are attached the first pole are attached to the side connector element(s) by means of the pivot bolt assembly 15 into the adjoining pivot plates 24,11. Final rotation of all the connector elements is made by loosening the clamps and retightening in precisely the exact angle needed for the pivot plate mating connection.

This procedure is repeated until all joints that collaborate in the frame have been installed. When this occurs the builder can choose to replace all the temporary clamps with the prescribed permanent fastening hardware options in the parts list. This procedure has been successfully performed thousands of times in many field testing structures, one which subsequently endured extreme wind and rain conditions with no significant structural problems.

By this example, it can be understood why this two element bamboo connector assembly functions to the advantage of the builder in that the system allows for the characteristics of bamboo to be the focal point of the invention's adjustable function of joining at the terminal ends of one or two poles (which could also be any natural tree poles) to the side of a single pole in the simplest, yet most effective way to empower engineers, architects, and the builders to achieve accurate and strength enhancing results in constructing frames of natural bamboo or tree poles.

Figure 9:
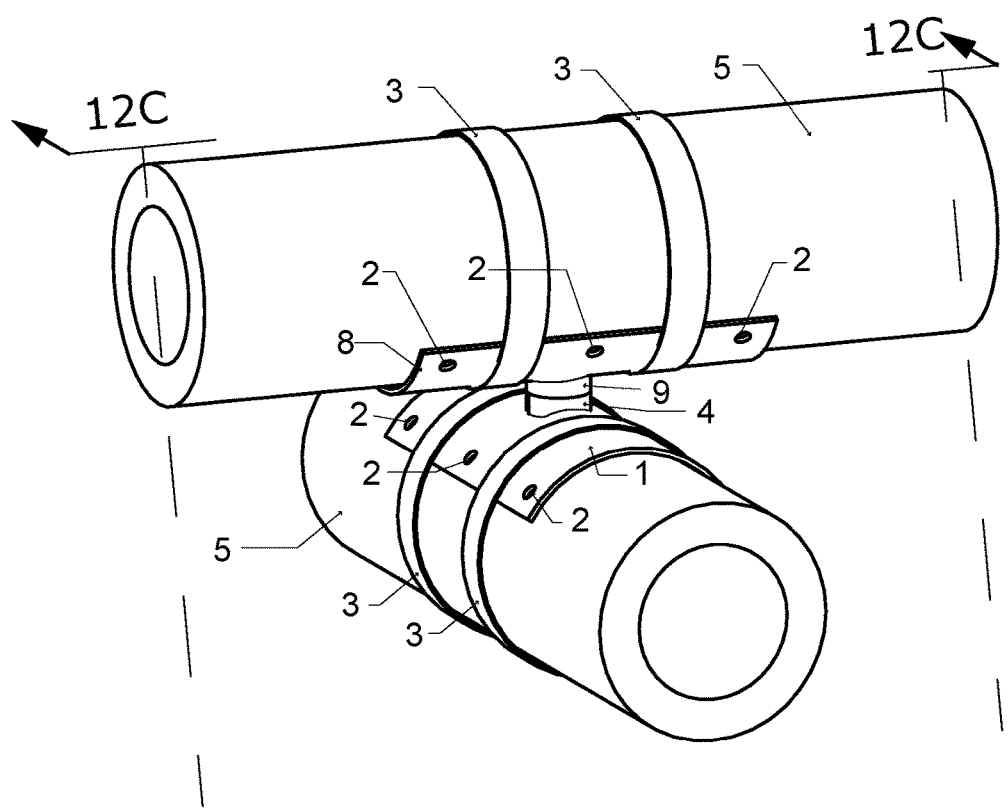
FIG. 9 shows an isometric perspective view in a horizontal plane of a connector assembly of the invention comprising a first side connector element pivotally joined to a second side connector element. Each of the connector elements are mounted to bamboo. The sectional drawing perspective indicators for FIG. 12C are also shown.

Example 3 Connector Assembly Comprising a First Side Connector Element Pivotally Joined to a Second Side Connector Element One embodiment of the invention provides a connector assembly comprising a first side connector element pivotally joined to a second side connector element. The side connector elements are configured to attach to the round sides of respective bamboo poles 5 that bypass each other, and that require a structural support connection at that point in the span of two poles within the bamboo structure frame. The connection can occur at any angle however a 90 degree angle is illustrated herein (FIG. 9). Each of the side connector elements comprise of a tube segment of a tube configuration (1,8), which can be provided in, e.g. sizes of ½ inch increments of diameter. Each of the side connector elements are chosen to fit a specific pole diameter at a selected location on each of the poles, then joined together at the discs 4,9. Both tube segments 1,8 are welded to respective flat discs 4,9 at the exact center of the width and usually at the center of the length of said curved tube segment. The discs 4,9 of the two connector elements fasten to each other on their exposed flat surfaces by means of a socket cap screw 10 (FIG. 12C), which enters through a center hole in the disc 9 and tube section 8 of the second side connector element. The disc 9 has a matching negative configuration precisely fit to the shape of the head of the cap screw 10, so that the top of said cap screw 10 is flush with the inside diameter surface of the tube segment 8 of the 9B the second side connector element (FIG. 12B, 12C). The tube segments 1,8 are thin enough to allow flexing in order to accommodate a pole diameter variation of 0.55 inch.

Figure 10A:
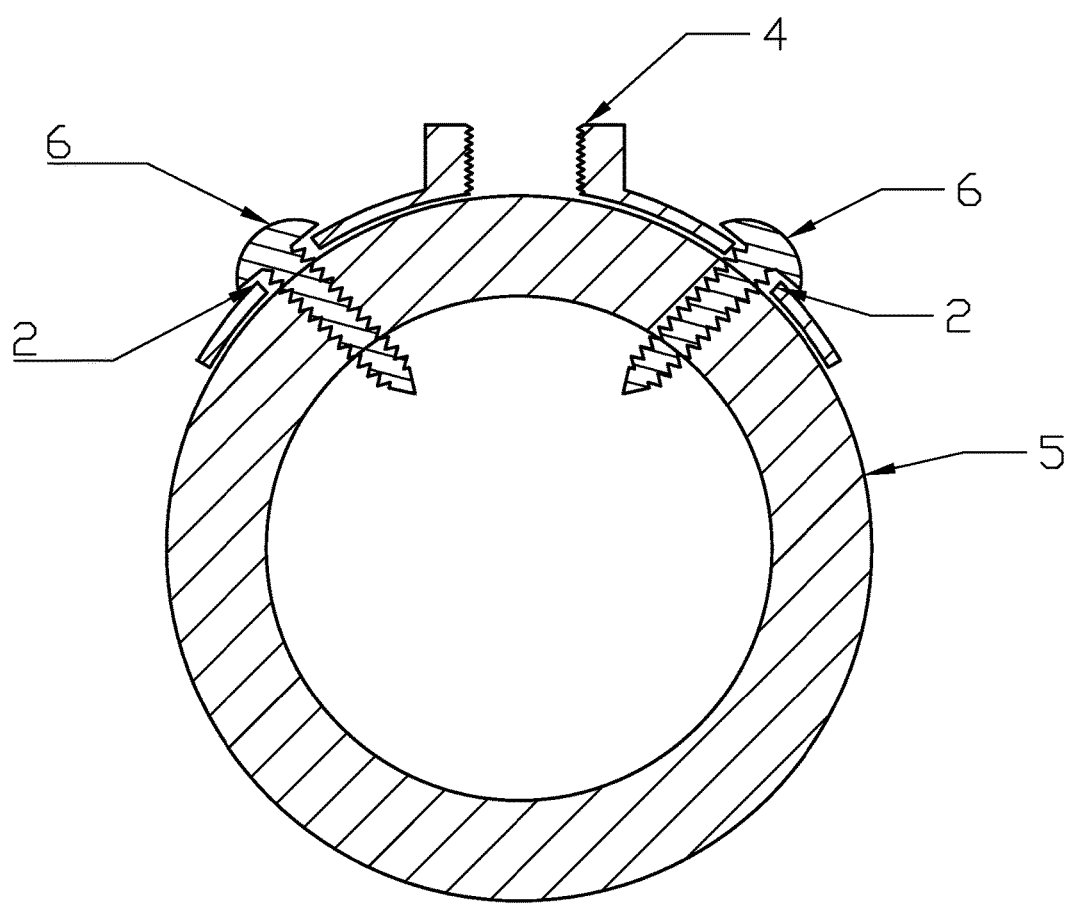
FIG. 10A shows a section view of the first side connector of the connector assembly shown in FIG. 9, mounted on a bamboo pole including the set screw placement angles illustrating resistance to pullout and rotational forces.
Figure 10B:
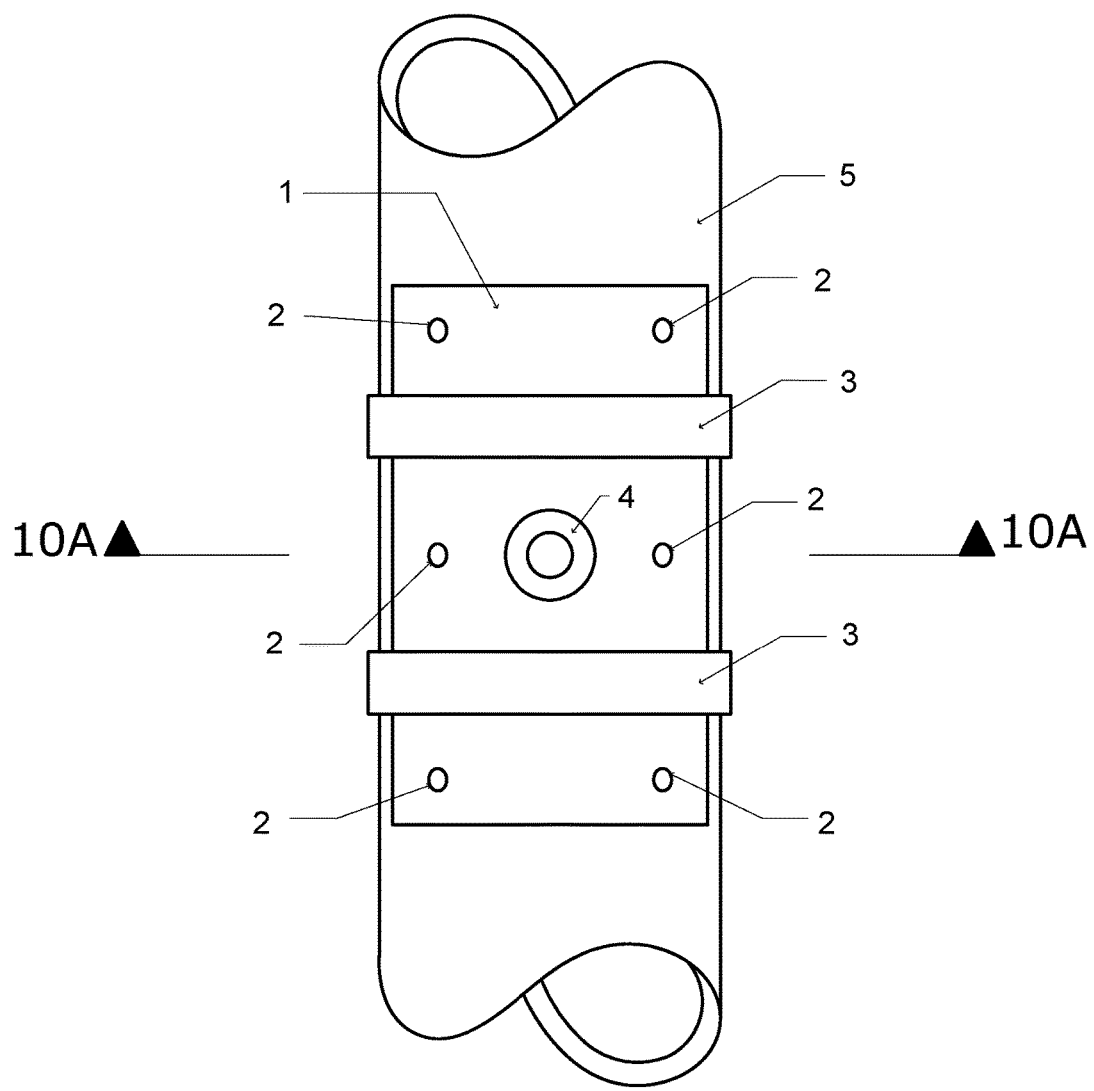
FIG. 10B shows the first side connector of the connector assembly shown in FIG. 9, mounted to a bamboo pole for additional understanding. Section references with perspective to FIG. 10A are also shown.
Figure 11:
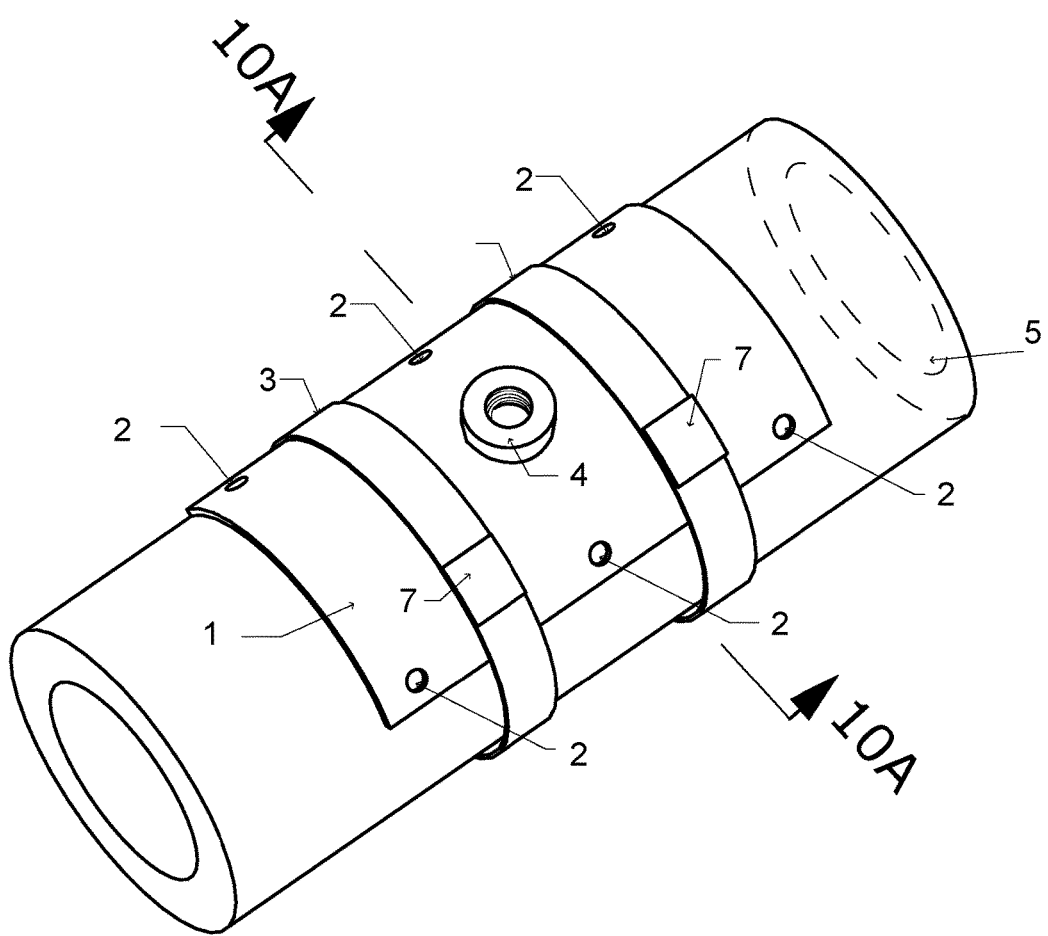
FIG. 11 shows an isometric perspective view of the first side connector of the connector assembly shown in FIG. 9, mounted on a bamboo pole section. This allows the viewer to understand the tube segment configuration fastened with the banding around the bamboo pole providing higher tension load capacity and a means of reinforcing the bamboo pole location. Normally the banding is used with at least two set screws to prevent rotation of said element on the pole. Section references with perspective to FIG. 10A are also shown.
Figure 12A:
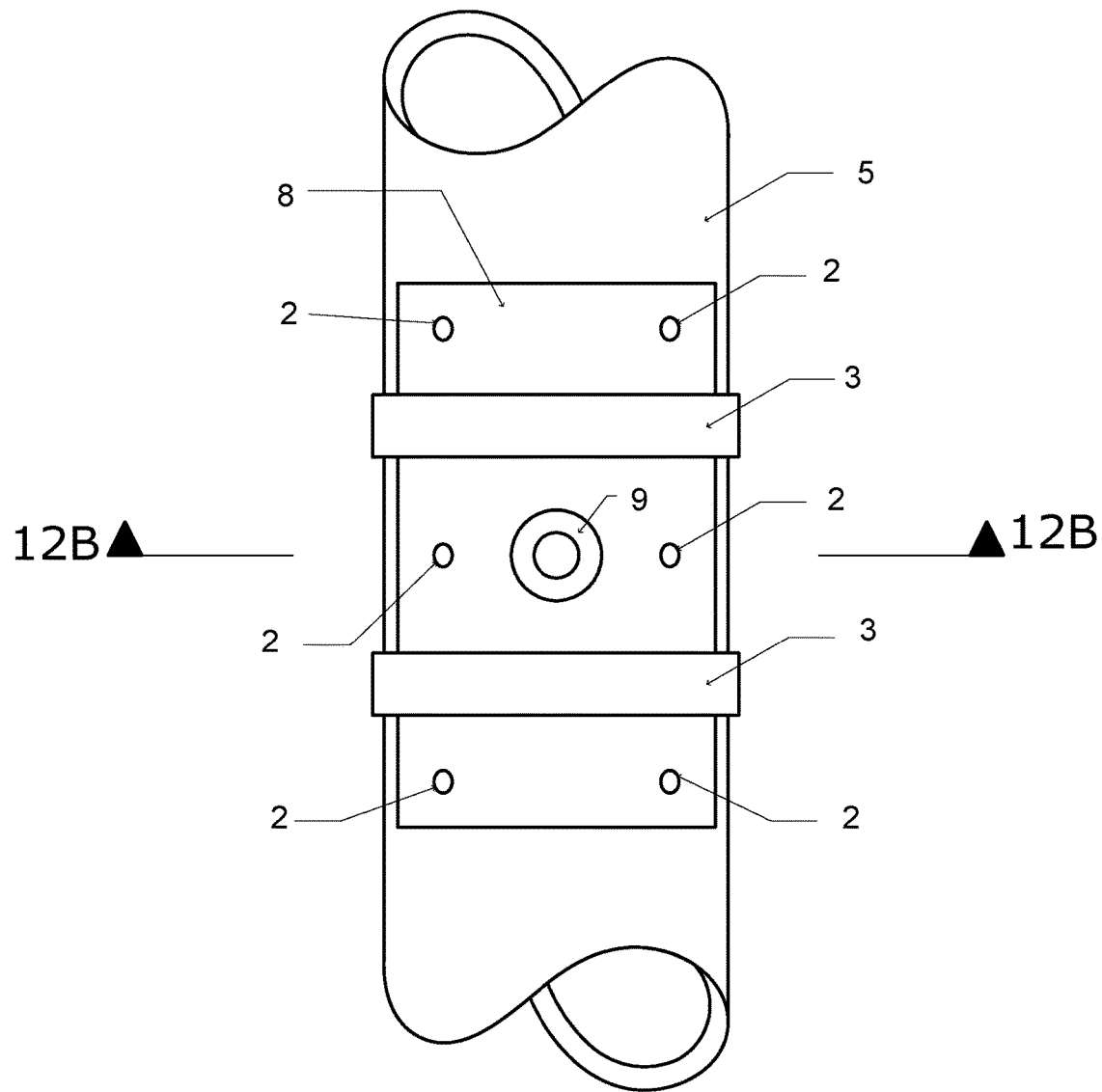
FIG. 12A shows the second side connector of the connector assembly shown in FIG. 9, mounted on a bamboo pole with banding fasteners, and section perspective indicators referring to FIG. 12B.
Figure 12B:
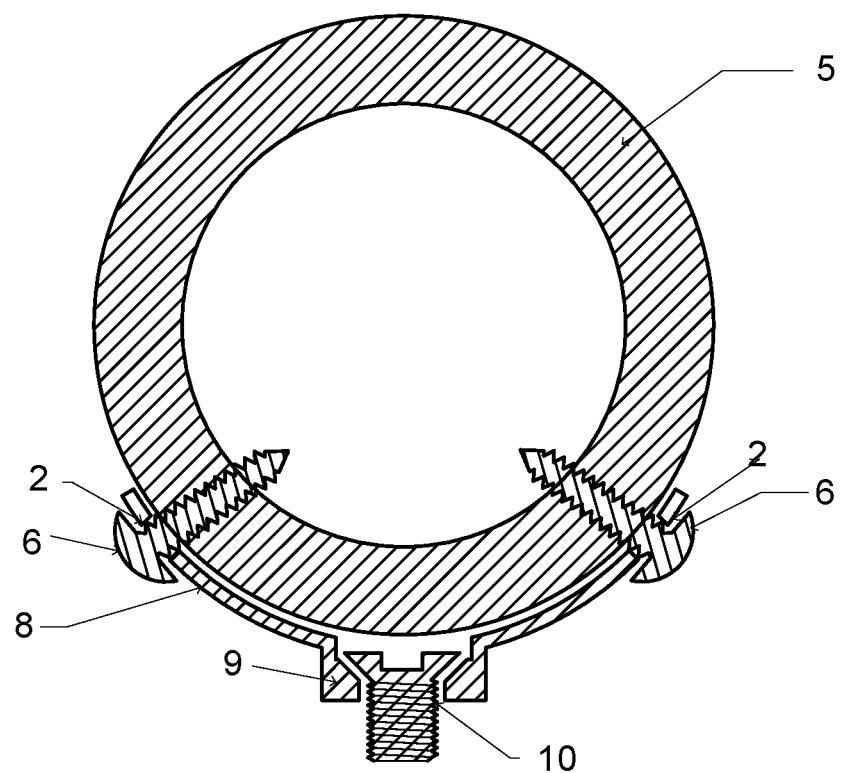
FIG. 12B shows a section view the second side connector of the connector assembly shown in FIG. 9, mounted to bamboo with set screws and with the cap screw in place for joining and pivotally mounting to the first side connector.
Figure 12C:
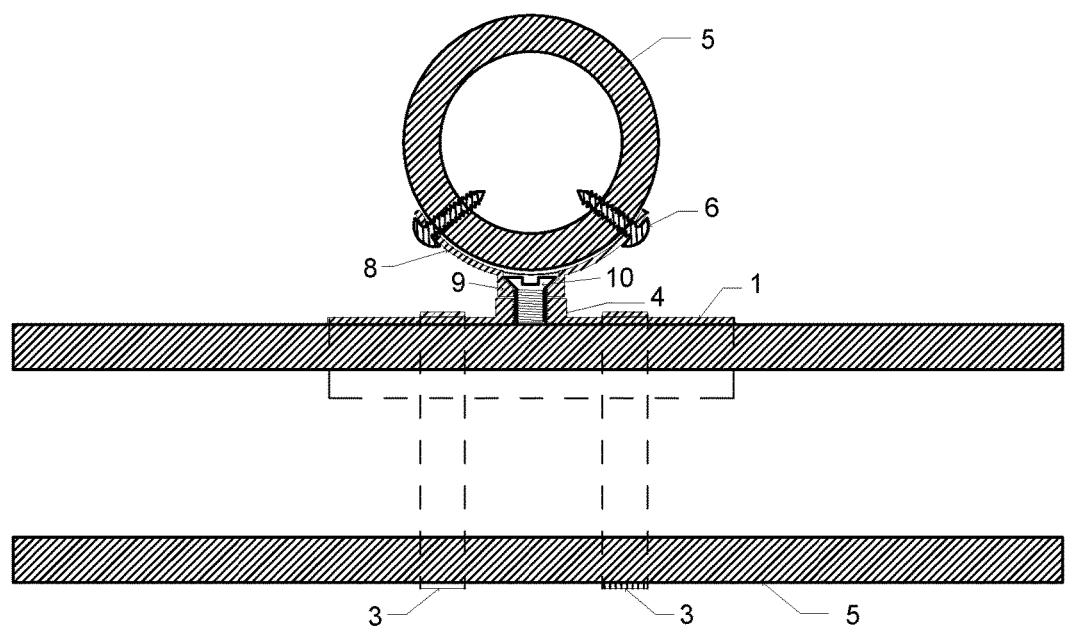
FIG. 12C shows a section view of the connector assembly shown in FIG. 9. Both of the side connector elements are mounted to bamboo and joined to each other at a 90 degree angle, illustrating the cap screw functioning as the means of joining the connector elements together while allowing rotation of the adjoining elements at the pivot joint.

The first side connector element (FIG. 11) has a threaded hole centered in the middle of the disc 4 which aligns to the center hole of the disc 9 of the second side connector element so that the threaded end of the cap screw 10 tightens the two discs 4,9 together at any angle when joined (FIG. 12A,12C). Both side connector elements have the same fastening system that secures the side connector elements to the respective poles at the joint location. The fastening system includes six set screw holes 2 located along their straight sides; three holes 2 inset along each side (FIG. 10B, 11, 12A). The set screws 6 also prevent rotation and sliding of the poles, or in conjunction with a minimum of two stainless steel bands 3, or equivalent, that encircle the pole. The bands 3 fit around the circumference of the pole on each side of the center disc (FIG. 9, 11) reinforcing the loading capacity of said pole significantly as tested.

Example 4 Method of Using a Connector Assembly

The connector assembly detailed in Example 3 is used to create a structure with bamboo poles. In this example, the invention is used within a construction frame wherein intersections occur where one pole is supported by another along the spans of the respective poles. Because the poles are round in shape, particularly when one horizontal pole loads the supporting horizontal pole from the top; the situation produces a critical "point load" effect wherein all the weight is transferred on the contact point. Bamboo particularly being tubular, but any round pole is at a disadvantage structurally due to this problem that doesn't exist with flat surfaced frames. Hence the invention serves to spread the load over the inside diameter surface areas of the mounted elements of the invention as they conform to the outside diameter surface areas of the poles. This dramatically increases the load bearing capacity of the adjoining poles.

A temporary means of fastening the invention to the pole with adjustable band clamps allows for adjustments until all joints that collaborate in the frame are in place.

When this occurs the builder can choose to replace all the temporary clamps with the prescribed permanent fastening hardware options in the parts list. This procedure has been successfully performed thousands of times in many experimental structures, one which subsequently endured extreme wind conditions with no significant structural problems.

By this example, it can be understood why this two connector element bamboo connector assembly functions to the advantage of the bamboo designer or builder in that the system allows for the characteristics of bamboo to be the focal point of the invention's function by means of increasing the load bearing capacity of bamboo poles (which could also be natural tree poles) in the simplest, yet most effective way to empower engineers, architects, and the builders to achieve accurate and strength enhancing results in constructing ultra-light frames of natural bamboo, or environmentally friendly with unprocessed tree poles.

While the description of the invention contains many specificities these should not be construed as limitations of the scope of the invention, but rather as an exemplification of one preferred embodiment thereof. Many other variations have been used.

Example 5 High Winds Experiment

A structure (a pavilion) having a bamboo frame was produced with connector assemblies of the invention. Surprisingly, the builders were able to quickly learn how to use the connector assemblies to form a bamboo structure and provided an efficient assembly mechanism for swiftly erecting the structure.

The frame had a roof made from a 1300 square foot PVC 22 oz tarp. The structure was installed in an extremely windy area, where wind speed varied from 50-80 mph during the experiment. The high winds caused billowing of the tarp, which was tied on to the frame. The high force exerted on the structure by the billowing tarp caused extreme contortions in the structure due to bending of the bamboo frame. Surprisingly, none of the bamboo poles sheared under the high stresses.

Surprisingly, it was observed that the bamboo frame was allowed to bend due to the pivoting function of the connector assembly without causing bamboo to shear at the respective connector elements, and then return to its normal alignment when the wind subsided. Each joint allow local bending of the connected bamboo poles. Even more surprisingly, however, was that the frame exhibited hugged contortions as a whole against the forces trapped within 1300 square feet of billowing tarp without damage to the frame, e.g. from shearing action. Accordingly, both local and global frame bending enabled the structure to withstand such high stress.

Example 6 Movement of a Fully Erected Structure

A large structure having a bamboo frame was produced with connector assemblies of the invention. After the structure was fully erected, it was decided to move the entire structure to a new location. Rather than disassemble the structure, it was decided to detach the frame from the ground and attempt to move the entire structure in its fully erected stated. The structure was loaded in its erected orientation on a transfer vehicle. During the trip to the new location, the erected structures continued to contort due to the winds and bumpy ground that the vehicle was traveling over. Surprisingly, no damage was sustained to the frame in transit of the fully erected structure.

The citations provided herein are hereby incorporated by reference for the cited subject matter.

What is claimed is:

1. A structure comprising a connector assembly comprising a first connector element and a second connector element pivotally joined to each other, wherein each of the first connector element and the second connector element comprises a curved member configured for attachment to the side of a respective bamboo pole, and wherein each of the first connector element and the second connector element is attached to the side of the respective bamboo pole.

2. The structure of claim 1, wherein the first connector element and the second connector element are pivotally joined to each other by a bypass joint.

3. The structure of claim 2, wherein each of the curved members is configured to conform to the side of the respective bamboo pole.

4. The structure of claim 3, wherein the connector assembly comprises one or more attachment mechanisms for attaching each of the curved members to the side of the respective bamboo pole, wherein the attachment mechanisms are selected from a band and set screws configured to screw into the side of the respective bamboo pole.

5. The structure of claim 3, wherein each of the curved members comprises a first curved member and a second curved member, wherein the first and second curved extend circumferentially away from each other.

6. The structure of claim 5, wherein each of the first and second curved members comprise a plurality of screw holes, wherein the plurality of screw holes in the first curved member are offset circumferentially relative to each other and wherein the plurality of screw holes in the second curved member are offset circumferentially relative to each other.

7. The structure of claim 6, wherein:
   a. the first curved member comprises a first longitudinal edge;
   b. the second curved members comprises a second longitudinal edge; and
   c. the first and second longitudinal edges are non-parallel to each other.

8. The structure of claim 1, wherein the curved members are configured to spread the load across the surface area of the respective bamboo poles.

9. A method comprising:
   a. providing a connector assembly comprising a first connector element and a second connector element pivotally joined to each other, wherein each of the first connector element and the second connector element comprises a curved member configured for attachment to the side of a respective bamboo pole;
   b. attaching the first connector element to the side of a first bamboo pole; and
   c. attaching the second connector element to the side of a second bamboo pole.

10. A structure comprising a connector assembly comprising a first connector element and a second connector element pivotally joined to each other; wherein
   i. each of the first connector element and the second connector element comprises a curved member configured for attachment to the side of a respective bamboo pole;
   ii. each of the curved members is configured to conform to the side of the respective bamboo pole;
   iii. the first connector element and a second connector element pivotally joined to each other by a bypass joint;
   iv. the connector assembly comprises one or more attachment mechanisms for attaching each of the curved members to the side of a bamboo pole, wherein the attachment mechanisms are selected from a band and set screw configured to screw into the side of a bamboo pole; and v. each of the first connector element and the second connector element is attached to the side of the respective bamboo pole.

11. A method comprising:
a. providing a connector assembly comprising a first connector element and a second connector element pivotally joined to each other; wherein
   i. each of the first connector element and the second connector element comprises a curved member configured for attachment to the side of a respective bamboo pole;
   ii. each of the curved members is configured to conform to the side of the respective bamboo pole;
   iii. the first connector element and a second connector element pivotally joined to each other by a bypass joint; and
   iv. the connector assembly comprises one or more attachment mechanisms for attaching each of the curved members to the side of a bamboo pole, wherein the attachment mechanisms are selected from a band and set screw configured to screw into the side of a bamboo pole;
b. attaching the first connector element to the side of a first bamboo pole; and
c. attaching the second connector element to the side of a second bamboo pole.

* * * * *